United States Patent
Gilch et al.

(10) Patent No.: US 8,109,089 B2
(45) Date of Patent: Feb. 7, 2012

(54) WASTE GATE ACTUATOR FOR AN EXHAUST GAS TURBOCHARGER

(75) Inventors: Markus Gilch, Mauern (DE); Stephan Heinrich, Pfeffenhausen (DE)

(73) Assignee: Continental Automotive GmbH, Hannover (DE)

( * ) Notice: Subject to any disclaimer, the term of this patent is extended or adjusted under 35 U.S.C. 154(b) by 206 days.

(21) Appl. No.: 12/310,635

(22) PCT Filed: Aug. 28, 2007

(86) PCT No.: PCT/EP2007/058903
§ 371 (c)(1),
(2), (4) Date: Feb. 27, 2009

(87) PCT Pub. No.: WO2008/025754
PCT Pub. Date: Mar. 6, 2008

(65) Prior Publication Data
US 2010/0175375 A1  Jul. 15, 2010

(30) Foreign Application Priority Data
Aug. 30, 2006 (DE) .................. 10 2006 040 667

(51) Int. Cl.
*F02D 23/00* (2006.01)
*G01B 7/14* (2006.01)
*G01D 5/14* (2006.01)
*F16K 31/02* (2006.01)
*F16K 31/44* (2006.01)

(52) U.S. Cl. ............... 60/602; 324/207.24; 324/207.15; 251/129.12; 251/229

(58) Field of Classification Search .............. 60/602; 324/207.12, 207.24–207.25, 177; 439/701; 335/205; 251/129.12, 279, 229; 137/554; 74/89.15
See application file for complete search history.

(56) References Cited

U.S. PATENT DOCUMENTS

| | | | | |
|---|---|---|---|---|
| 4,817,387 A * | 4/1989 | Lashbrook | | 60/611 |
| 4,850,193 A * | 7/1989 | Kawamura | | 60/608 |
| 5,248,940 A * | 9/1993 | Patience et al. | | 324/207.15 |
| 5,269,343 A * | 12/1993 | Trapp | | 251/229 |
| 5,274,328 A * | 12/1993 | Begin et al. | | 324/207.24 |
| 5,701,741 A * | 12/1997 | Halsall | | 60/602 |
| 6,089,019 A * | 7/2000 | Roby et al. | | 60/605.2 |
| 6,178,837 B1 * | 1/2001 | Nagai et al. | | 74/89.23 |
| 6,480,782 B2 * | 11/2002 | Brackney et al. | | 701/108 |
| 6,530,754 B2 * | 3/2003 | Vogel | | 417/407 |
| 7,000,392 B2 * | 2/2006 | Greentree | | 60/602 |
| 7,044,444 B2 * | 5/2006 | Haubold et al. | | 251/229 |
| 7,426,829 B2 * | 9/2008 | Greentree | | 60/602 |

(Continued)

FOREIGN PATENT DOCUMENTS

| | | | |
|---|---|---|---|
| DE | 2923644 A1 * | 12/1979 | |
| DE | 102005010921 A1 | 2/2006 | |
| DE | 102004052695 A1 | 5/2007 | |
| EP | 2199565 A1 * | 6/2010 | |
| WO | WO 2006045680 A1 | 5/2006 | |
| WO | WO 2007033914 A1 | 3/2007 | |
| WO | WO 2007085535 A1 | 8/2007 | |
| WO | WO 2009156246 A1 * | 12/2009 | |

*Primary Examiner* — Thai Ba Trieu
(74) *Attorney, Agent, or Firm* — Cozen O'Connor (57) ABSTRACT

A waste gate actuator for an exhaust gas turbocharger, including an actuator housing and an actuator cover, an element for actuating the waste gate valve and electronic components for controlling the element to actuate the waste gate valve being arranged in the waste gate actuator. Provided is a simple and inexpensive revolution counting system on the turbocharger which allows the number of revolutions of the rotating parts (turbine wheel, compressor wheel, turboshaft) to be detected without substantial constructional alterations to the design of existing turbochargers. A sensor for detecting the variations in a magnetic field that are produced by the rotation of the rotating parts is arranged in or on the actuator housing or in or on the actuator cover.

13 Claims, 5 Drawing Sheets

U.S. PATENT DOCUMENTS

| | | | |
|---|---|---|---|
| 7,536,860 B2* | 5/2009 | Safran et al. | 60/523 |
| 7,669,581 B2* | 3/2010 | Sasaki | 251/129.12 |
| 2004/0189284 A1* | 9/2004 | Haubold et al. | 324/207.24 |
| 2007/0186551 A1 | 8/2007 | Ante et al. | |
| 2007/0240676 A1* | 10/2007 | Sasaki | 251/305 |
| 2008/0115570 A1 | 5/2008 | Ante et al. | |
| 2009/0039713 A1* | 2/2009 | Bott et al. | 324/207.24 |
| 2009/0121816 A1* | 5/2009 | Nishikawa et al. | 335/205 |
| 2009/0256554 A1* | 10/2009 | Gerlach et al. | 324/207.24 |
| 2010/0148760 A1* | 6/2010 | Cox et al. | 324/177 |
| 2011/0021087 A1* | 1/2011 | Koltermann et al. | 439/701 |
| 2011/0050212 A1* | 3/2011 | Henning | 324/207.25 |

* cited by examiner

WASTE GATE ACTUATOR FOR AN EXHAUST GAS TURBOCHARGER

PRIORITY CLAIM

This is a U.S. national stage of application No. PCT/EP2007/058903, filed on 28 Aug. 2007 which claims Priority to the German Application No.: 10 2006 040 667.2, filed: 30 Aug. 2006; the content of both being incorporated here by reference.

BACKGROUND OF THE INVENTION

1. Field of the Invention

The invention relates to a waste gate actuator for an exhaust gas turbocharger, comprising an actuator housing and an actuator cover, wherein an element for actuating the waste gate valve and electronic components for controlling the element for actuating the waste gate valve are arranged in the waste gate actuator.

2. Description of the Prior Art

The power generated by an internal combustion engine depends on the air mass and the quantity of fuel which can be fed to the internal combustion engine. If it is desired to increase the power of the internal combustion engine, it is necessary to feed in more combustion air and fuel. This increase in power is brought about in an induction engine by increasing the cubic capacity or by raising the rotational speed. However, increasing the cubic capacity basically produces internal combustion engines which are relatively heavy and have relatively large dimensions and are therefore expensive. Raising the rotational speed entails considerable problems and disadvantages, particularly in relatively large internal combustion engines.

A technical solution which is often adopted in order to increase the power of an internal combustion engine is supercharging. This refers to the precompression of the combustion air by an exhaust gas turbocharger or by a compressor which is driven mechanically by the engine. An exhaust gas turbocharger is essentially composed of a compressor and a turbine, which are connected to a common shaft and rotate at the same rotational speed. The turbine converts the energy which is normally output uselessly through the exhaust gas into a rotational energy, and said turbine drives the compressor. The compressor sucks in fresh air and feeds the pre-compressed air to the individual cylinders of the engine. An increased quantity of fuel can be fed to the relatively large quantity of air in the cylinders, as a result of which the internal combustion engine outputs more power. The combustion process is additionally favorably influenced, with the effect that the internal combustion engine has a higher overall efficiency level. Furthermore, the torque profile of an internal combustion engine, which is supercharged with a turbocharger can be made extremely favorable.

Series induction motors from vehicle manufacturers can be significantly optimized by using an exhaust gas turbocharger without intervening structurally to a large extent in the internal combustion engine. Supercharged internal combustion engines generally have a relatively low specific fuel consumption and have lower emissions of pollutants. Furthermore, turbo engines are generally quieter than induction engines with the same power level since the exhaust gas turbocharger itself acts as an additional silencer.

In internal combustion engines with a large operating rotational speed range, for example in internal combustion engines for passenger cars, a high charging pressure is already required at low rotational speeds of the engine. For this purpose, a charging pressure control valve, referred to as a waste gate valve, is introduced into these turbochargers. By selecting a corresponding turbine casing, a high charging pressure is built up even at low rotational speeds of the engine. The waste gate valve then limits the charging pressure to a constant value as the rotational speed of the engine increases.

As the quantity of exhaust gas increases, the maximum permissible rotational speed of the combination of the turbine wheel, the compressor wheel and the turboshaft, which is also referred to as the rotating parts of the exhaust gas turbocharger, is exceeded. If the rotational speed of the rotating parts were to be unacceptably exceeded, the rotating parts would be destroyed, which would amount to the turbocharger being totally written off. Particularly modern and small turbochargers with significantly smaller turbine wheel diameters and compressor wheel diameters, which have an improved rotational acceleration behavior due to a considerably smaller moment of mass inertia, are affected by the problem of the maximum rotational speed being exceeded. Depending on the configuration of the turbocharger, complete destruction of the turbocharger occurs even if the rotational speed limit is exceeded by only approximately 5%.

Waste gate valves which, according to the prior art are controlled by a signal resulting from the generated charging pressure, have proven useful for limiting the rotational speed. If the charging pressure exceeds a predefined threshold value, the waste gate valve opens and conducts part of the mass flow of exhaust gas past the turbine. Because of the reduced mass flow, said turbine takes up less power and the compressor power is reduced to the same degree. The charging pressure and the rotational speed of the turbine wheel and of the compressor wheel are reduced. However, this control is relatively slow acting since the build-up in pressure, when the rotational speed of the rotating parts is exceeded, occurs with a time delay. For this reason, the control of the rotational speed of the turbocharger with monitoring of the charging pressure must occur in the highly dynamic range (load change) by correspondingly reducing the charging pressure at an early point, which leads to a loss of efficiency.

SUMMARY OF THE INVENTION

German patent application number 10 2004 052 695.8, not published before the priority date of the present document, discloses an exhaust gas turbocharger with a sensor at the compressor-side end of the turboshaft for directly measuring the rotational speed of the turboshaft. The sensor is guided here through the compressor housing and directed at an element for varying a magnetic field. When the sensor is integrated in the compressor housing, sealing problems arise which can only be overcome with costly interventions into the design of the exhaust gas turbocharger owing to the high thermal loading of an exhaust gas turbocharger.

An object of the present invention is therefore to specify a system for measuring the rotational speed of an exhaust gas turbocharger with which the rotational speed of the rotating parts (turbine wheel, compressor wheel, turboshaft) is sensed easily and cost-effectively and without significant structural interventions in the design of existing exhaust gas turbochargers.

This object is achieved according to the invention by means of the features of independent claim 1.

If a sensor for sensing the variation in a magnetic field which is caused by the rotation of the rotating parts is arranged in or on the actuator housing or in or on the actuator cover, the rotational speed of the rotating parts can also be sensed with the actuator. There is no need for a separate rotational speed sensor, providing a saving in terms of electrical lines and housing parts. The sensor, which is arranged in or on the actuator housing or in or on the actuator cover, passes its signals directly to the actuator, and in this context the signals cannot be disrupted in the actuator by electromagnetic pulses which are input from the outside. The signal generated by the sensor used to control the waste gate valve very quickly and precisely in order to avoid the rotational speed of the rotating parts being exceeded. The exhaust gas turbocharger can therefore always be operated very close to its rotational speed limit, as a result of which optimum efficiency is achieved.

In one embodiment, a printed circuit board, on which the electronic components for controlling the element for actuating the waste gate valve and the electronic components for evaluating the sensor signals are arranged, is arranged in the actuator housing. If both the electronic components for controlling the element for actuating the waste gate valve and the electronic components for evaluating the sensor signals are arranged on a single printed circuit board, the sensor signals can be used directly for controlling the waste gate valve. The entire system becomes less susceptible to interference because electrical conductors, soldering points and plugs are dispensed with and by virtue of the shielding of the electronic components against electromagnetic waves by the actuator housing, the system is protected against electromagnetically induced interference. The short signal transit times also bring about reliable functioning of the system.

In another embodiment the sensor has a Hall sensor element. Hall sensor elements are very well suited for sensing the variation in a magnetic field and are therefore very well suited for use in sensing rotational speeds. Hall sensor elements can be acquired commercially at very low cost and can even be used at temperatures up to approximately 160° C.

In another embodiment, the sensor element is embodied as a magnetoresistive (MR) sensor element. MR sensor elements are, for their part, well suited to sensing the variation in a magnetic field and can be acquired commercially at low cost.

In a further embodiment, the sensor has an inductive sensor element. Inductive sensor elements are also very well suited for sensing the variation in a magnetic field and can be used at relatively high temperatures.

In a further embodiment, the actuator housing and/or the actuator cover are composed of aluminum. Aluminum is robust and lightweight and shields electromagnetic waves well. Furthermore, it is satisfactorily permeable to the magnetic field, as a result of which the variation in the magnetic field which is generated by the element for varying the magnetic field can be satisfactorily sensed even if the sensor is arranged in the actuator housing or actuator cover.

In one embodiment, the actuator housing and/or the actuator cover are composed of a plastic. Plastics are very inexpensive and can be used advantageously in terms of their stability and light weight. The actuator housing which is composed of plastic and/or the actuator cover which is composed of plastic can be covered with a metal in order to achieve a good shielding effect against external electromagnetic influences. The plastic housing which is covered with metal and/or the plastic cover which is covered with metal are also satisfactorily permeable to the magnetic field. A metal coating can be provided, for example, by vapor-coating the plastic. It is also conceivable to add metal particles to a plastic during manufacture in order to achieve the shielding effect against external electromagnetic influences.

BRIEF DESCRIPTION OF THE DRAWINGS

Embodiments of the invention are illustrated by way of example in the figures, of which.

DETAILED DESCRIPTION OF THE PRESENTLY PREFERRED EMBODIMENTS

Figure 1:
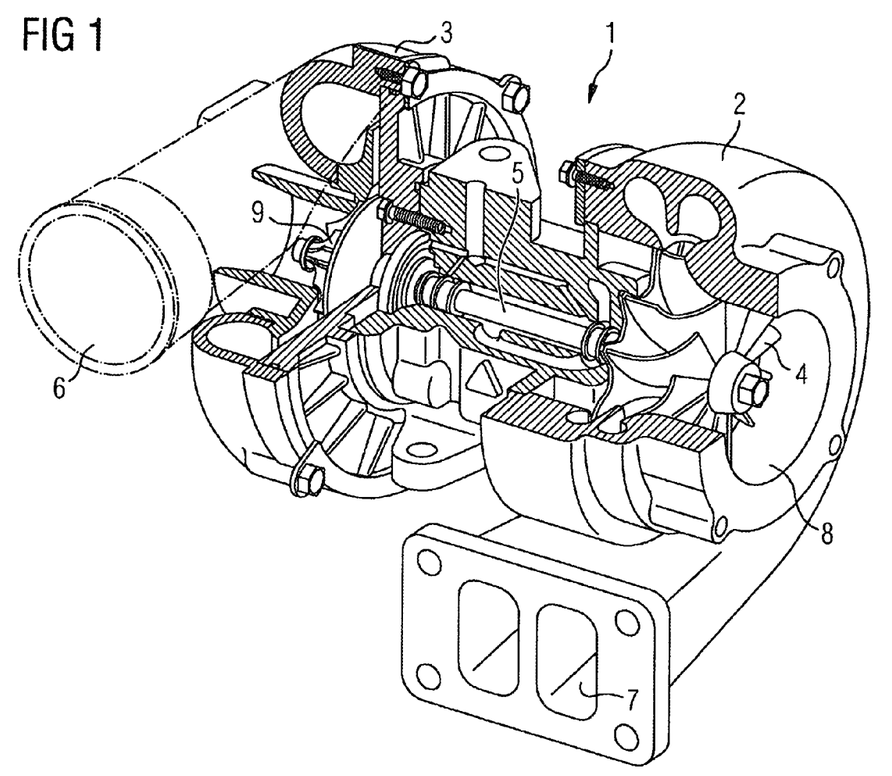
FIG. 1 is a perspective view of an exhaust gas turbocharger.

FIG. 1 shows a customary exhaust gas turbocharger 1 with a turbine 2 and a compressor 3. The compressor wheel 9 is rotatably mounted in the compressor 3 and is connected to the turboshaft 5. The turboshaft 5 is also rotatably mounted and connected at its other end to the turbine wheel 4. The combination of the compressor wheel 9, turboshaft 5 and turbine wheel 4 is also referred to as the moving parts. Hot exhaust gas is let into the turbine 2 via the turbine inlet 7 from an internal combustion engine (not illustrated here), in which case the turbine wheel 4 is made to rotate. The exhaust gas stream leaves the turbine 2 through the turbine outlet 8. The turbine wheel 4 is connected to the compressor wheel 9 via the turboshaft 5. The turbine 2 therefore drives the compressor 3. In the compressor 3, air is sucked in through the air inlet 17 (FIG. 2), and is then compressed in the compressor 3 and fed to the internal combustion engine via the air outlet 6.

Figure 2:
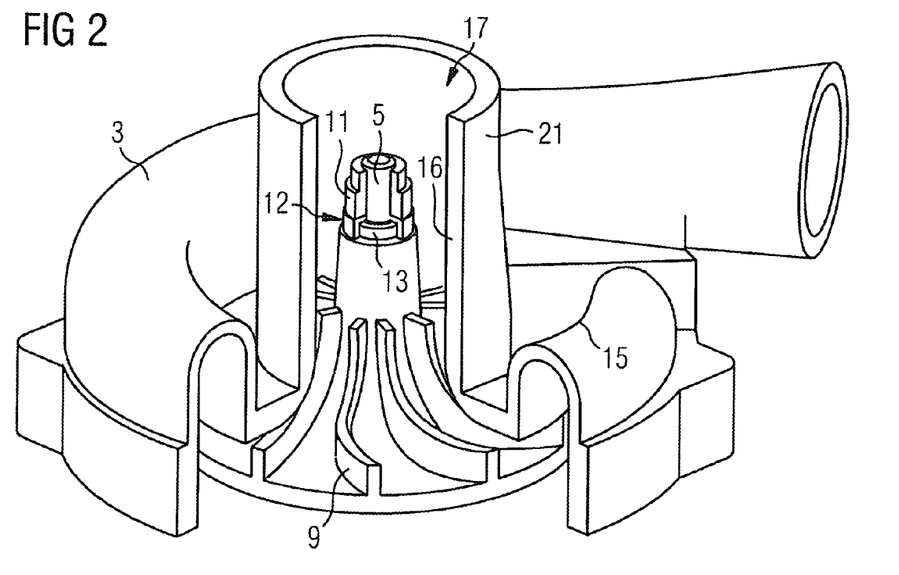
FIG. 2 shows the compressor of FIG. 1 in a partial section.

FIG. 2 shows the compressor 3 in a partial section. The compressor wheel 9 can be seen in the cut-open compressor housing 21. The compressor wheel 9 is attached to the attachment element 11 on the turboshaft 5. The attachment element 11 can be, for example, a cap nut which is screwed onto a thread which is provided on the turboshaft 5, in order to use said cap nut to tension the compressor wheel 9 against a collar of the turboshaft 5. The element 12 for varying the magnetic field is located between the attachment element 11 and the compressor wheel 9. The element 12 is designed here to vary the magnetic field from a magnet 13 and a holding means 14. The element 12 for varying the magnetic field is pressed against the compressor wheel 9 by the attachment element 11, and during the rotation of the turboshaft 5 the element 12 for varying the magnetic field rotates about the rotational axis of the turboshaft 5. In doing so, the element 12 for varying the magnetic field brings about a change in the magnetic field strength or the magnetic field gradient in the sensor element 16. The sensor element 16 is integrated into the sensor 15, the sensor 15 being described in more detail in the following figures. The variation of the magnetic field or of the field gradient produces an electronically processable signal in the sensor element 16, which signal is proportional to the rotational speed of the turboshaft 5.

Figure 3:
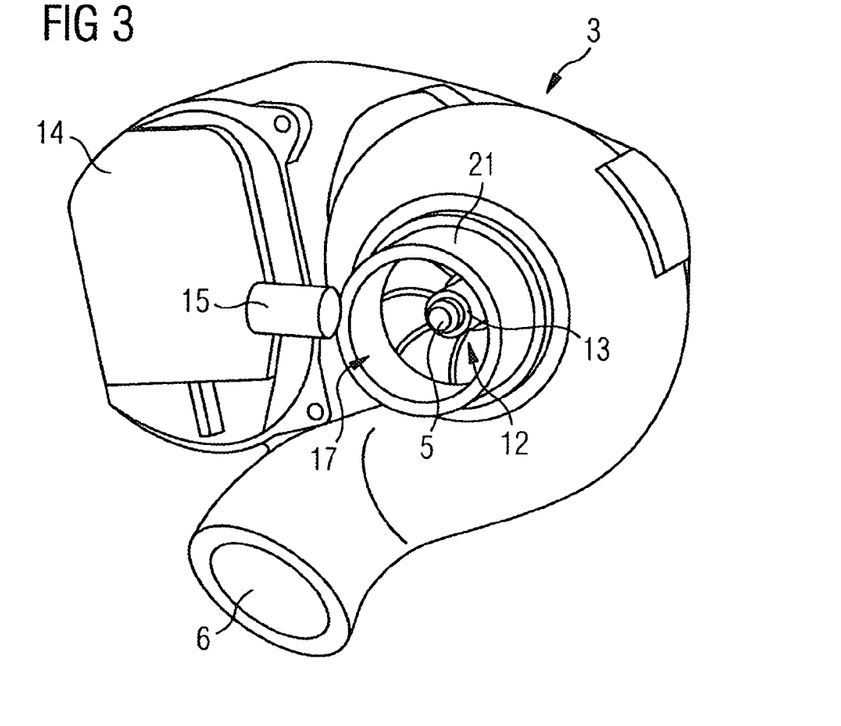
FIG. 3 is a perspective view of an exhaust gas turbocharger with a waste gate actuator.

FIG. 3 shows the compressor 3 of the exhaust gas turbocharger 1. The turboshaft 5 with an element for varying a magnetic field can be seen in the air inlet 17 of the compressor 3. The element 12 for varying the magnetic field can be, for example, a bar magnet which is arranged on the turboshaft 5. However, it is also conceivable for an element which periodically collects the magnetic field and disperses it to be arranged on the turboshaft 5, in which case the collection and dispersion is caused by the rotation of the turboshaft 5. The generation of the magnetic field is then carried out, for example, by a bar magnet which is arranged in the sensor 15. The sensor 15 is arranged here on the housing 18 of the waste gate actuator 14. The waste gate actuator 14 opens the waste gate valve if an excessively high rotational speed of the turboshaft 5, and therefore of all the rotating parts (turbine wheel 4, turboshaft 5 and compressor wheel 9) is detected by the sensor 15. When a sufficiently strong magnet 13 is used, the magnetic field can penetrate the compressor housing 21 if the latter is composed, for example, of aluminum or plastic. The magnetic field which is generated by the magnet 13 is sensed by the sensor 15 and the sensor element 16 contained therein, and is made available to an electronic evaluation system which is also integrated in the waste gate actuator 14. Furthermore, FIG. 3 shows the air outlet 6 of the compressor 3.

Figure 4:
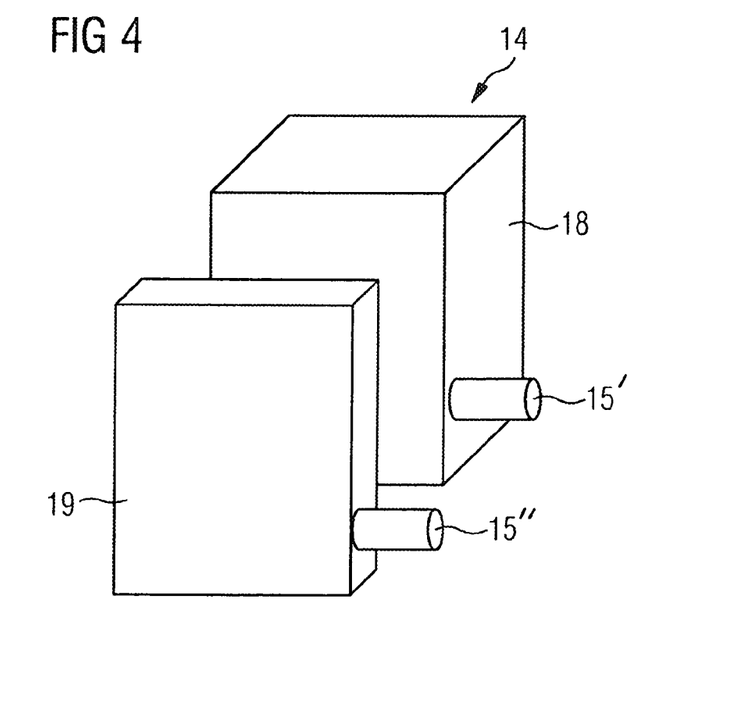
FIG. 4 is a perspective view of the waste gate actuator with the actuator housing and the actuator cover.

FIG. 4 shows the waste gate actuator 14 with its actuator housing 18 and the actuator cover 19. The sensor 15 for sensing the variation in a magnetic field which is caused by the rotation of the rotating parts can be arranged either on the actuator housing 18 (sensor 15″) or on the actuator cover 19 (sensor 15′).

Figure 5:
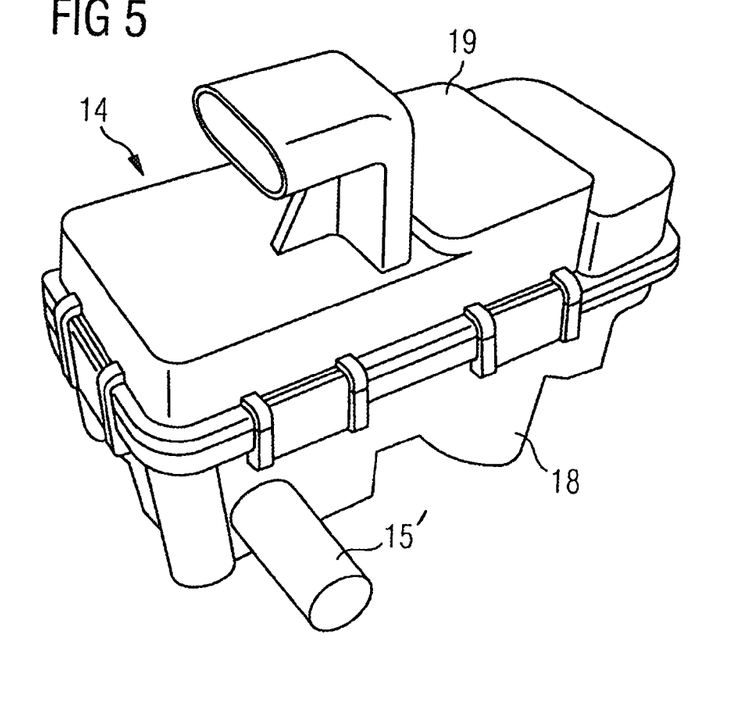
FIG. 5 is a perspective view of the waste gate actuator once more.

FIG. 5 also shows the waste gate actuator 14 with the actuator cover 19 and the actuator housing 18. The sensor 15′ for sensing the rotational speed of the rotating parts is arranged on the actuator housing 18 here.

Figure 6:
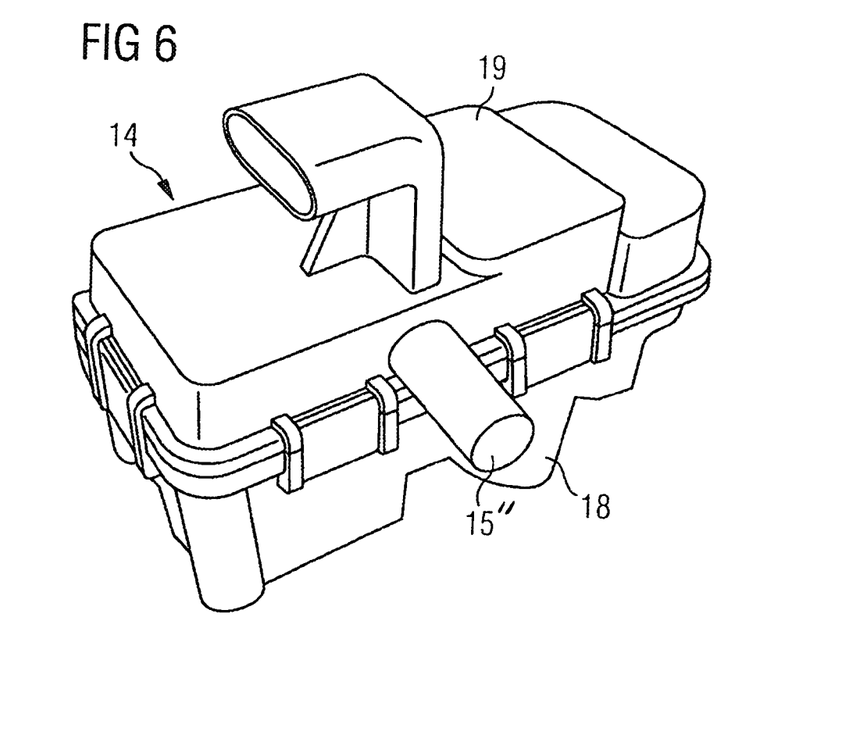
FIG. 6 is a perspective view of the waste gate actuator which is known from FIG. 5.

FIG. 6 shows the waste gate actuator 14 which is known from FIG. 5, the sensor 15″ for sensing the rotation of the rotating parts being arranged on the actuator cover 19 here.

Figure 7:
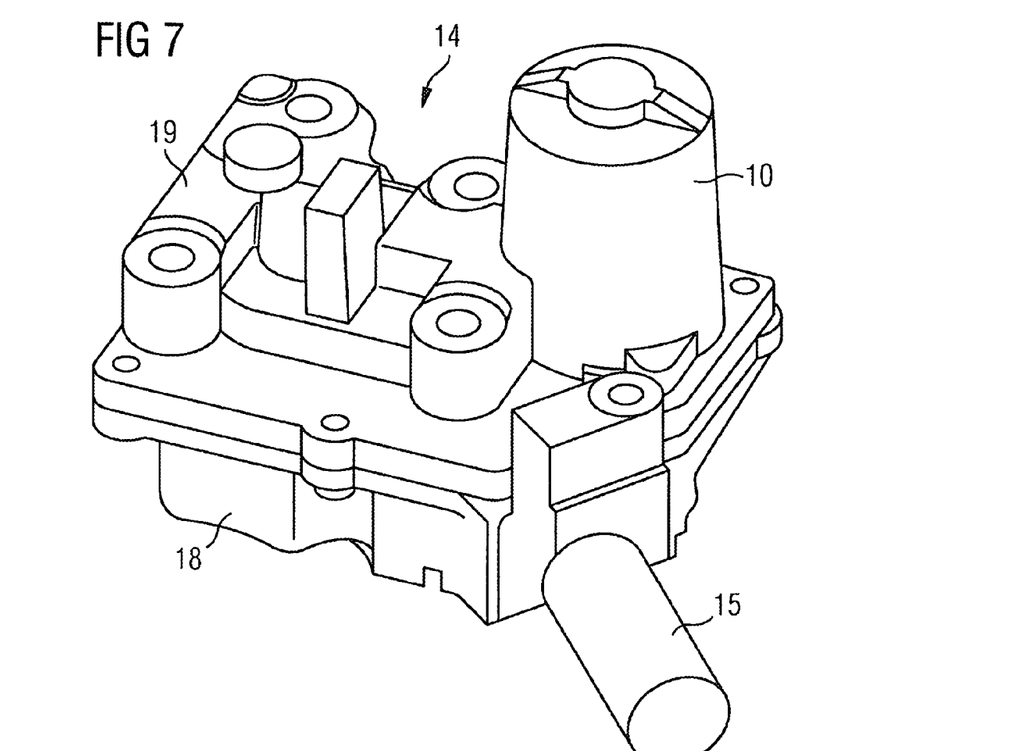
FIG. 7 is a perspective view of the waste gate actuator again.

The waste gate actuator 14 is also illustrated in FIG. 7. Here, the receptacle for the electric motor 10 of the waste gate actuator 14 which drives the waste gate valve can be seen here, for example, in the actuator cover 19. In FIG. 7, the sensor 15′ for sensing the rotational speed of the rotating parts is again arranged on the actuator housing 18.

Figure 8:
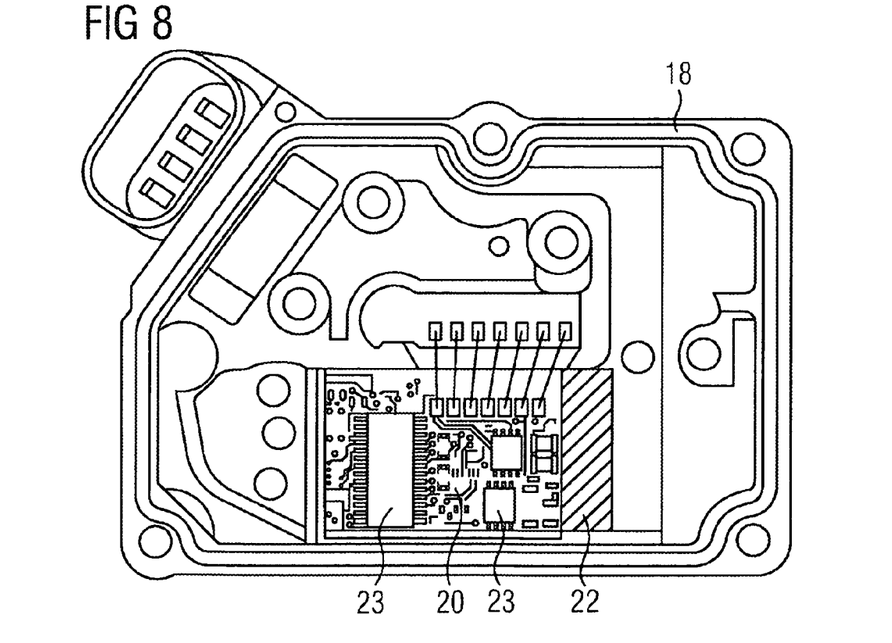
FIG. 8 is a top view into the actuator housing.

FIG. 8 shows a view into the actuator housing 18. A printed circuit board 20, which is equipped with electronic components 23, can be seen. Electronic components 23 are used to control the waste gate valve. Furthermore, a region 22, which serves to accommodate electronic components 23 that are necessary to evaluate the signals from the sensor element 16, is formed on the printed circuit board 20. Electronic components 23 for controlling the waste gate valve and for evaluating the signals which are generated by the sensor element 16 are integrated on the printed circuit board 20. This spatially dense integration of the electronic components for both functions results in a particularly interference-resistant system.

Figure 9:
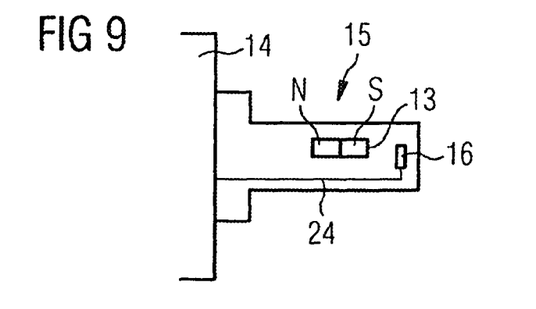
FIG. 9 is a schematic example of the design of the sensor.

FIG. 9 shows an example of the design of the sensor 15. The sensor 15 is arranged on the waste gate actuator 14 and said sensor 15 contains a permanent magnet 13 with a north pole N and south pole S as well as a sensor element 16, which can be embodied, for example, as a Hall sensor or magnetoresistive sensor. The sensor element 16 is connected to the electronic components 23 illustrated in FIG. 8 by means of electrical conductors 24.

Figure 10:
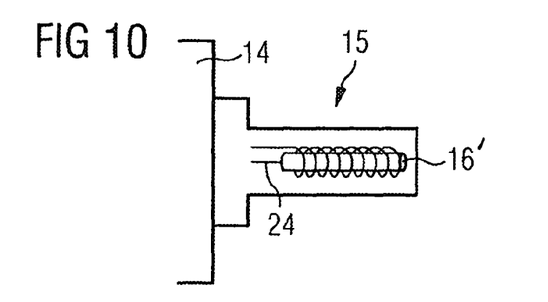
FIG. 10 is a schematic of a different embodiment of the sensor.

FIG. 10 also shows a sensor 15 which is provided on the waste gate actuator 14. According to FIG. 10, a sensor element 16′, which is embodied as an inductive sensor element, is arranged in the sensor 15. Inductive sensor elements generally comprise an iron core and a coil arranged thereon. The electrical conductors 24, which connect the sensor element 16′ to the electronic components 23, can also be seen here again.

Figure 11:
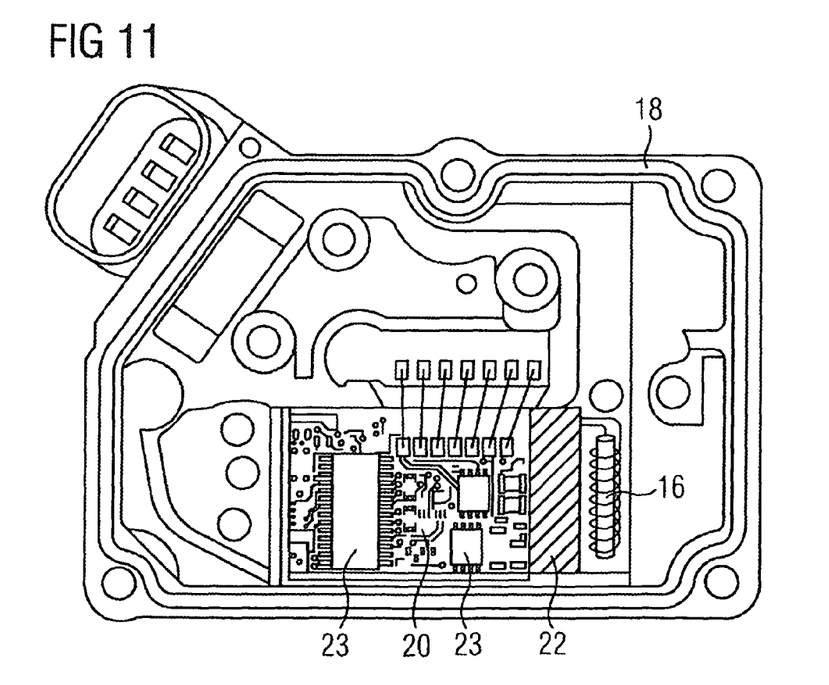
FIG. 11 is a top view of an opened actuator housing with the printed circuit board.

FIG. 11 shows the opened actuator housing 18 with the printed circuit board 20, which accommodates both the electronic components 23 for the waste gate actuator and, in region 22, the electronic components for the sensor 15. The sensor element 16 is arranged in the actuator housing 18 here, with the actuator housing 18 being composed of a material which does not shield the magnetic field lines. This material is preferably aluminum or plastic. The integration of the sensor 15 for sensing the rotational speed of the turbocharger into the waste gate actuator 14 provides a series of advantages over the separate arrangement of the sensor 15 on the turbocharger 1. Integrating the sensor 15 into the waste gate actuator 14 provides savings in terms of material, and the system as a whole becomes more functionally reliable since the electronic components can also be integrated on a printed circuit board 20, and the entire circuitry and the sensor element 16 can be accommodated in one housing, as a result of which external electromagnetic interference no longer has any influence on the system.

A further advantage of the arrangement of the sensor 15 in or on the actuator housing 18 or in or on the actuator cover 19 is the temperature in said locations. Exhaust gas turbochargers 1 are components which are subject to high thermal loading and temperatures up to 1000° C. Known sensor elements 19, such as, for example, Hall sensors or magnetoresistive sensors cannot be used for measuring at these temperatures. Significantly lower temperature loading occurs in or on the actuator housing 18 or in or on the actuator cover 19. Nevertheless, the magnetic field is sufficient to obtain a measurement of the rotational speed of the rotating parts. Since the arrangement as described is in the cold region in or on the actuator housing 18 or in or on the actuator cover 19, sensor elements 16 can be used which can be obtained commercially and at low cost. Owing to the relatively low temperature loading, there is no need for unusually high requirements to be made of the sensor elements 16 in terms of their temperature stability.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A waste gate actuator for an exhaust gas turbocharger, the waste gate actuator comprising:
   an actuator housing;
   an actuator cover configured to mate with the actuator housing;
   a waste gate valve actuating element configured to actuate a waste gate valve arranged in the actuator housing;

electronic components configured to control the waste gate valve actuating element arranged in the actuator housing;

a sensor configured to sense a variation in a magnetic field produced by a rotation of at rotating parts of the exhaust gas turbocharger, wherein the sensor is arranged in or on one of the actuator housing and the actuator cover.

2. The waste gate actuator according to claim 1, further comprising a printed circuit board arranged in the actuator housing, wherein the electronic components configured to control the waste gate valve actuating element and electronic components configured to evaluate sensor signals are arranged on the printed circuit board.

3. The waste gate actuator according to claim 2, wherein at least one of the actuator housing and the actuator cover is aluminum.

4. The waste gate actuator according to claim 2, wherein at least one of the actuator housing and the actuator cover is plastic.

5. The waste gate actuator according to claim 2, wherein the sensor comprises a magnetoresistive sensor element.

6. The waste gate actuator according to claim 5, wherein the sensor comprises a Hall sensor element.

7. The waste gate actuator according to claim 2, wherein the sensor comprises an inductive sensor element.

8. The waste gate actuator according to claim 2, wherein at least one of the actuator housing and the actuator cover is metalized plastic.

9. The waste gate actuator according to claim 8, wherein a metal is vapor coated on the plastic.

10. The waste gate actuator according to claim 8, wherein metal particles are added to the plastic during manufacture.

11. The waste gate actuator according to claim 1, wherein the sensor comprises a magnetoresistive sensor element.

12. The waste gate actuator according to claim 1, wherein the sensor comprises a Hall sensor element.

13. The waste gate actuator according to claim 1, wherein the sensor comprises an inductive sensor element.

\* \* \* \* \*